July 11, 1933.      H. SINGER      1,918,068
INDICATING DEVICE
Filed May 28, 1932
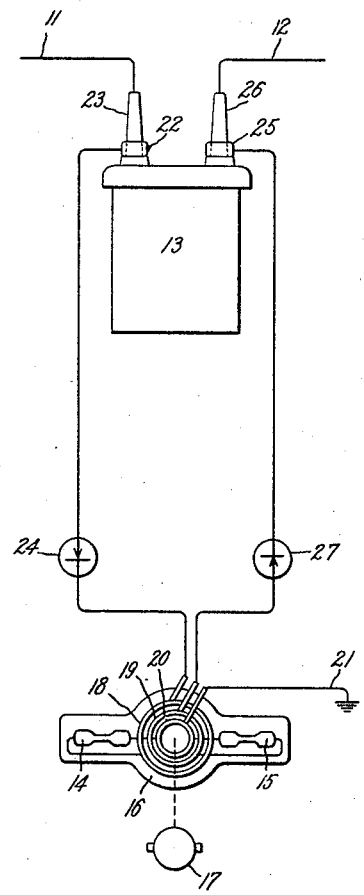
Inventor:
Hanns Singer,
by Charles E. Mullen
His Attorney.

Patented July 11, 1933

1,918,068

UNITED STATES PATENT OFFICE

HANNS SINGER, OF BERLIN-STEGLITZ, GERMANY, ASSIGNOR TO GENERAL ELECTRIC COMPANY, A CORPORATION OF NEW YORK

INDICATING DEVICE

Application filed May 28, 1932, Serial No. 614,201, and in Germany August 14, 1931.

My invention relates to indicating devices and concerns particularly frequency and phase indicators.

It is an object of my invention to provide a simple and easily used apparatus for obtaining visible indications of phase and frequency of alternating-current electrical circuits or of the phase and frequency relationships between alternating-current circuits, including the rate of change in the phase or relative frequencies.

It is a further object of my invention to provide an apparatus by means of which the circuit leading in phase or the circuit having the greater frequency may be identified.

It is still another object of my invention to provide phase and frequency indicating apparatus requiring only a low volt-ampere excitation.

A further object of my invention is to provide an arrangement for quickly and easily determining when two electrical systems are in phase and may safely be connected. Other and further objects and advantages will become apparent as the description proceeds.

In accordance with my invention in its preferred form, a pair of lamps of the type intermittently illuminated by the peaks of an alternating-current wave are mounted on a revolving member and each of the lamps is energized in response to one of the electrical circuits to be compared in phase and frequency. The lamps used may take the form of luminous discharge tubes.

The features of my invention which I believe to be novel and patentable will be pointed out in the claims appended hereto. My invention itself however will be best understood by referring to the following description taken in connection with the single figure of the accompanying diagrammatic drawing.

Referring now more in detail to the drawing, two electrical circuits or systems having conductors 11 and 12 are arranged so that the systems may be connected by means of any suitable device such as an oil switch indicated at 13. For simplicity only one conductor of each circuit is shown. A pair of lamps having the property of being illuminated intermittently at a rate determined by the energizing frequency is mounted on a rotating arm 16. The lamps 14 and 15 may if desired take the form of neon tubes or other types of luminous discharge tubes. A suitable driving means 17 is provided for rotating the arm 16.

In order that the tubes may be connected to the desired circuits, slip rings 18, 19 and 20 are provided on the revolving arm 16. One of the slip rings is connected to ground by a conductor 21 in order to provide a return path for the currents energizing the lamps 14 and 15, but it will be understood that I am not limited to this arrangement for supplying energy to the lamps, as an additional slip ring may be provided and the lamps may be provided with independent metal return paths to suitable points in the circuits by which they are energized.

The lamps may be energized in any suitable manner directly from the corresponding circuits or from auxiliary circuits varying in phase and frequency in the same manner as the main circuits. In the arrangement shown a capacitive connection is provided between the lamps and the corresponding circuits, so that the lamp circuits are energized by electrostatic induction. Lamp 14 has one terminal grounded through slip ring 20 and conductor 21 and the other terminal coupled to conductor 11 by means of a conducting band 22 surrounding the bushing 23 of the oil switch 13. The band 22 may take the form of coating or deposit on the surface of the bushing 23. In this manner, the expense of a potential transformer may be avoided.

If desired, the lamps may be arranged to become illuminated only once during the cycle of the energizing circuit. This may be accomplished by providing lamps which are inherently rectifying or which operate only with current in a given direction, or may be accomplished by inserting rectifiers in the lamp circuits. Accordingly, rectifier 24 of any desired type may be connected between slip ring 18 and metal band 22. In a similar manner the discharge tube 15 has one terminal connected through slip ring 20 and conductor 21 to ground, and the other terminal connected through slip ring 19, rectifier 27 and metal band 25 surrounding bushing 26 of the oil switch 13 in a circuit capacitively coupled to alternating-current system 12. Although I prefer the method of connection shown for the sake of greater simplicity and reduced cost, it will be understood that I am not limited to this exact arrangement.

The operation of the device is as follows: Discharge tubes 14 and 15 have the property of becoming luminescent only when the energizing voltage approaches a certain value. In order that the lamps will be illuminated only during the peak value of one-half of each cycle, the rectifiers 24 and 27 are employed. Since the lamp circuits are highly condensive there will be a tendency to accentuate the peaks of the exciting currents and accordingly the lamps may be so designed that they will be illuminated only a brief instant during the cycle of alternating current. Since the arm 16 is being rotated, the flashes of light produced by lamps 14 and 15 will appear to remain stationary if the frequencies of the energizing circuits are the same as the rotative speed of the driving motor 17, but will appear to move backwards if the frequencies are greater and forward if the frequencies are less than the rotative speed of the motor 17. Regardless of the speed of motor 17, the spot produced by lamp 14 will appear to rotate backwards with respect to the spot produced by lamp 15 when the frequency of circuit 11 exceeds that of circuit 12. The exact speed of motor 17 is, therefore, immaterial. In order that the flashes corresponding to the two circuits may be identified, means are preferably employed for distinguishing the flashes of the two lamps by color or otherwise; for example, lamp 14 may be filled with a gas such as neon producing a red flash and lamp 15 may be filled with a gas or a mixture of substances such as argon gas and mercury vapor producing a green flash. The flashes may also be distinguished by placing the lamps 14 and 15 at different distances from the center of rotation so that the flashes will have different radii.

With the lamps 14 and 15 on opposite sides of the center of rotation of the arm 16, as shown, the rectifiers 24 and 27 are preferably oppositely connected so that the lamps 14 and 15 will be energized by opposite half-cycles of the circuits 11 and 12. Accordingly, when the circuits 11 and 12 are exactly in phase the flashes produced by lamps 14 and 15 will appear to coincide. This condition indicates that the oil switch 13 may safely be closed to connect circuits 11 and 12. The arrangement not only serves to indicate the relative frequencies of the two circuits by the rate at which the angular relationship between the flashes of lamps 14 and 15 vary, but it also provides an indication of the instantaneous phase relationship showing which circuit is in advance in phase, since the angle between the flashes provides an indication of the phase angle between the two circuits.

It will be understood that if lamps 14 and 15 are placed on the same side of the center of rotation of arm 16, rectifiers 24 and 27 will be connected in the same manner instead of oppositely. In this case phase coincidence will be indicated by the fact that the flashes of the lamps 14 and 15 occur along the same radius though obviously they could not then be made to coincide.

It will also be understood that if the arm 16 carrying the lamps 14 and 15 is driven at the synchronous speed of one of the alternating-current circuits, for example, by means of a synchronous motor connected to that circuit, it will not be necessary to provide lamps having distinguishable characteristics since the lamp energized by the circuit to which the synchronous motor is connected will produce a spot of light which appears to remain stationary, whereas the spot of light produced by the other lamp will tend to rotate whenever the two systems depart from synchronism. Since the light produced by one of the lamps appears to remain stationary, obviously this lamp could be omitted if desired in certain cases. Such an arrangement might be employed for instance in connection with only one alternating-current circuit in order to obtain an indication of its frequency by driving the arm 16 at a known speed and connecting the rotating lamp to the electrical circuit. The spot of light would then appear to remain stationary whenever the frequency coincided with the speed of the driving mechanism.

Although I have suggested an arrangement which might be used to determine when two electrical systems may be connected together, it will be understood that my arrangement might also be employed where it was desired only to compare two electrical circuits and it was not intended to interconnect the circuits. For example, the frequency of an alternating-current power system might by means of my device be compared with the frequency of a standard oscillator of any desired type having a known frequency.

In accordance with the provisions of the patent statutes I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. In combination with a pair of alternating-current circuits, a lamp intermittently illuminated at a rate determined by the frequency of one of said alternating-current circuits, a second lamp differing in appearance from said first mentioned lamp and intermittently illuminated at a rate determined by the frequency of the other of said alternating-current circuits, means for rotating both lamps about a common center of rotation for the purpose of producing spots of light which remain fixed in angular position relative to each other when said alternating circuits have the same frequency but which appear to vary in angular relationship when said circuits are of different frequencies.

2. In combination with a pair of conductors independently energized by alternating voltages, a lamp intermittently illuminated at a rate determined by the frequency of alternation of one of said voltages, a second lamp intermittently illuminated at a rate determined by the frequency of alternation of the other of said voltages, means for revolving said lamps at an angular speed synchronous with the rate of alternation of one of said voltages whereby a spot of light appearing to be stationary is produced in response to one of said voltages and a second spot of light is produced appearing to rotate at an angular speed determined by the difference in frequency between the two alternating voltages.

3. In combination with a pair of alternating-current systems, a lamp intermittently illuminated at a rate determined by the frequency of one of said systems, a second lamp intermittently illuminated at a rate determined by the frequency of the other of said systems, means for revolving said lamps about a common center whereby spots of light are produced which appear to vary in angular relationship when said alternating-current systems are of different frequencies but which appear to remain fixed in relative angular relationship when said alternating-current systems have the same frequency.

4. In combination with a pair of alternating-current systems, a lamp energized by one of said alternating-current systems and becoming luminous only at voltages corresponding to peak values in the voltage wave, thereby being intermittently illuminated at a rate determined by the frequency of said alternating-current system, and means for revolving said lamp at an angular velocity synchronous with the frequency of the other of said alternating-current systems.

5. In combination with a pair of alternating-current systems, a discharge tube energized by electrostatic induction from one of said systems so as to be intermittently illuminated at a rate determined by the frequency of said system, a second discharge tube energized by electrostatic induction from the other of said systems so as to be intermittently illuminated at a rate determined by the frequency of the latter alternating-current system, and means for revolving said discharge tubes at the same speed about a common center of rotation.

6. In combination with a pair of alternating-current circuits, a discharge tube energized by electrostatic induction from one of said circuits and becoming luminous only at voltages corresponding to peak values in the voltage wave so as to be illuminated intermittently at a rate determined by the frequency of said circuit, and means for revolving said discharge tube at an angular velocity synchronous with the frequency of the other of said circuits.

7. In combination with a pair of alternating-current systems, a discharge tube energized by one of said systems, a second discharge tube energized by the other of said systems, said tubes being revolved about a common center of rotation at an angular velocity synchronous with the frequency of one of said systems, said tubes being intermittently illuminated at frequencies determined by the frequencies of the energizing systems so as to produce spots of light which appear to remain stationary with respect to each other when the alternating-current systems are of the same frequency but which appear to vary in angular relationship when said alternating-current systems are of different frequencies.

8. In combination with a pair of alternating-current systems, a discharge tube and a rectifier connected in series in a circuit capacitively coupled to one of said systems, a second discharge tube and a second rectifier connected in series in a circuit capacitively coupled to the other of said systems, and means for revolving said lamps at the same speed, each of said lamps being momentarily illuminated once during each cycle of the alternating-current systems by which it is energized, thereby producing spots of light which appear to remain in a fixed relative angular relationship when the alternating-current systems are of the same frequency but which appear to vary in angular relationship when the alternating-current systems are of different frequencies.

9. In combination with a pair of alternating-current systems, a discharge tube and a rectifier connected in series in a circuit energized with currents of the same frequency as one of said alternating-current systems, and means for revolving said discharge tube at an angular velocity synchronous with the frequency of the other of said alternating-current systems, said discharge tube being intermittently illuminated once during each cycle of the energizing circuit, thereby producing a spot of light which appears to remain stationary when the alternating-current systems are of the same frequency but which appears to revolve when the systems are of different frequencies.

10. In combination with a pair of alternating-current systems, a discharge tube energized by one of said systems and producing light of a given color, a second discharge tube energized by the other of said systems and producing light of a different color from said first mentioned discharge tube, said tubes being revolved about a common center of rotation and being intermittently illuminated at frequencies determined by the frequencies of the energizing systems so as to produce distinguishable spots of light which appear to remain in a fixed angular relation with respect to each other when the alternating-current systems are of the same frequency but which appear to vary in angular relationship when said alternating-current systems are of different frequencies.

11. In combination with an alternating-current circuit, a lamp energized by said alternating-current circuit and becoming luminous only at voltages corresponding to peak values in the voltage wave, thereby being intermittenly illuminated at a rate determined by the frequency of said circuit, and means for revolving said lamp at a predetermined angular velocity thereby providing means for comparing the frequency of said circuit with the frequency corresponding to said predetermined angular velocity.

12. In combination with an alternating-current circuit, a discharge tube energized by electrostatic induction from said circuit and becoming luminous only at voltages corresponding to peak values in the voltage wave so as to be illuminated intermittenly at a rate determined by the frequency of said circuit, and means for revolving said discharge tube at a predetermined angular velocity thereby providing means for comparing the frequency of said circuit with the frequency corresponding to said predetermined angular velocity.

In witness whereof, I have hereunto set my hand.

HANNS SINGER.